Nov. 15, 1960 — G. SWANSON — 2,960,309
TREE FELLING JACK
Filed Sept. 9, 1958
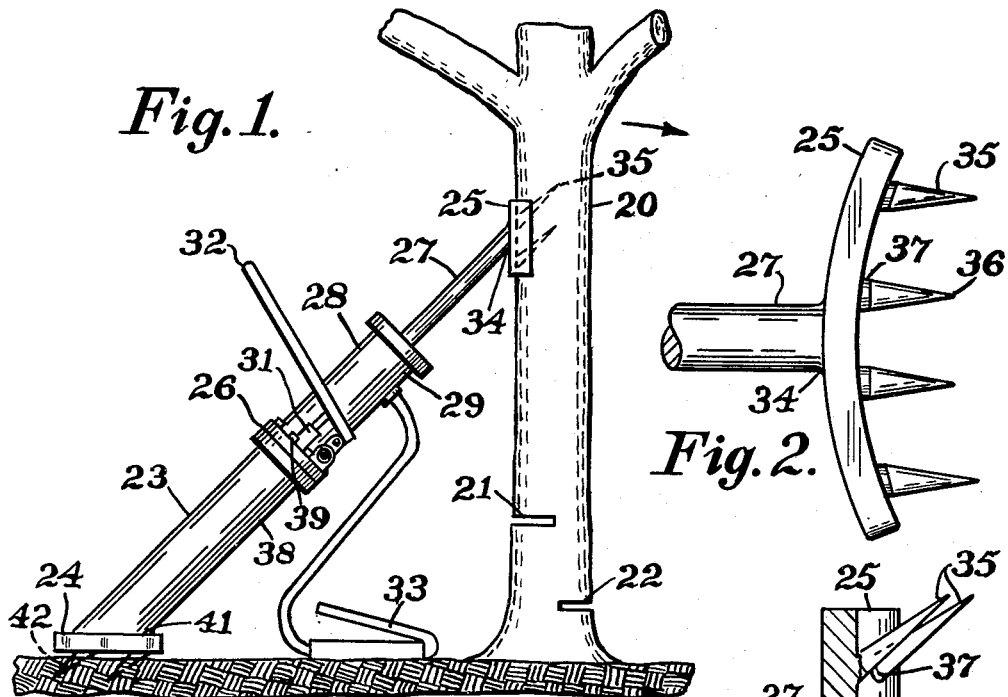
Fig. 1.
Fig. 2.
Fig. 3.
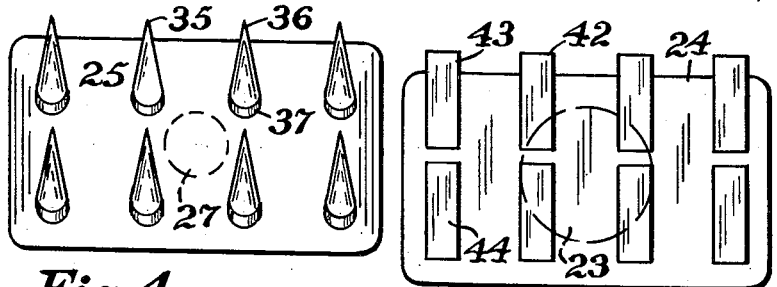
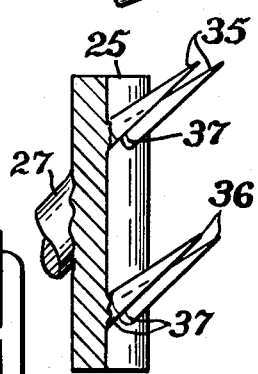
Fig. 4.
Fig. 5.
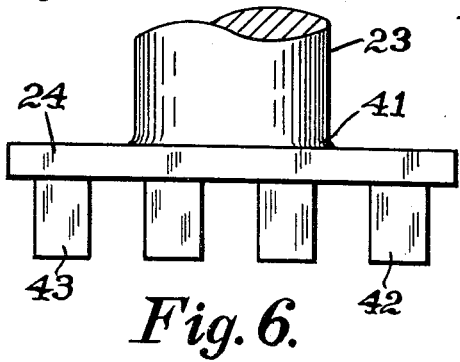
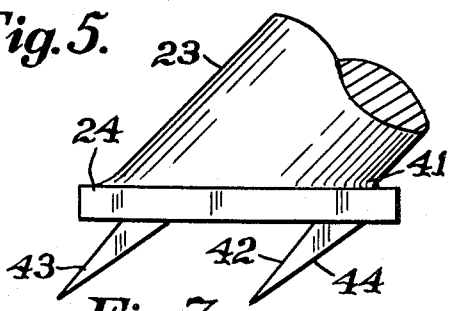
Fig. 6.
Fig. 7.
INVENTOR.
GOSTA SWANSON
BY
Pearson + Pearson
ATTORNEYS

United States Patent Office 2,960,309
Patented Nov. 15, 1960

2,960,309

TREE FELLING JACK

Gosta Swanson, P.O. Box 26, Hollis, N.H.

Filed Sept. 9, 1958, Ser. No. 759,883

4 Claims. (Cl. 254—133)

This invention relates to an improved tree jack for use in applying pressure on a tree about to be felled.

Such jacks have heretofore been proposed either as part of a tree felling tractor as in U.S. Patent 2,462,314 to Fuqua of February 22, 1949 or as a separate tree felling jack as in U.S. Patent 2,583,945 to Jacobs of January 29, 1952.

Usually, however, jacks of this type have included compression springs to apply resilient thrust as the tree tilts and pivot means to permit the jack to swing or shift with the tree.

It is the object of this invention to provide a separate manual tree jack having integral pronged anchor plates fixed to elongated, hydraulically actuated, pressure members, the prongs being angularly disposed relative to the plates, but in parallelism with the pressure members and thereby releasing their grip during the felling of the tree.

Another object of the invention is to provide a manually operable tree jack of simple, rugged construction and of the hydraulic type whereby the application of thrust can be remotely controlled by the saw operator without moving to the jack.

A further object of the invention is to provide a tree felling jack with the jack mechanism about midway of the length thereof and supported on a relatively heavy, extension or base whereby inertia tends to prevent the jack from swinging with a falling tree.

Other objects and advantages of the invention will be apparent from the claims, the description of the drawing and from the drawing in which Fig. 1 is a side elevation of the tree felling jack of this invention.

Fig. 2 is an enlarged plan view of the curved anchor plate.

Fig. 3 is an enlarged side view, in section, of the curved anchor plate.

Fig. 4 is an enlarged front view of the curved anchor plate.

Fig. 5 is an enlarged front view of the flat anchor plate.

Fig. 6 is an enlarged rear view of the flat anchor plate and

Fig. 7 is an enlarged side view of the flat anchor plate.

As shown in the drawing, 20 is a tree in which the usual felling cuts 21 and 22 have been made by a saw or other means, the tree being intended to fall in the direction of the arrow.

23 represents the tree felling jack of this invention, jack 23 including the flat anchor plate 24, the curved anchor plate 25, the first elongated pressure member 26, the second elongated pressure member 27 and the jacking mechanism 28.

Jacking mechanism 28 is preferably a hydraulic jack of any well known construction having a main cylinder 29, a smaller cylinder 31 and a handle 32. As shown at 33 a remotely controlled hydraulic jack mechanism may also be used if desired to enable the saw operator to apply pressure from his location near the cut 21. Such remote control mechanism is commercially available for example, the "Porto Power" jack of Blackhawk Manufacturing Company of Milwaukee, Wisconsin.

The second elongated pressure member 27 is preferably the piston of the jacking mechanism 28 and is axially aligned with the first pressure member 26 and slideable in the cylinder 29 whereby application of pressure in the cylinder causes thrust to be exerted longitudinally of the jack. The anchor plate 25 is curved to conform to the curvature of a tree and is immovably affixed, as by welding, to the terminal end 34 of member 27. Plate 25 is angularly related to the member 27, rather than normal thereto, and includes a plurality of spaced prongs 35 in parallelism with each other and with member 27. The prongs 35 are identical with sharp terminal points as at 36 and cylindrical bases as at 37. The length thereof is somewhat exaggerated in the drawing for clarity, the sharp points 36 being just long enough to penetrate into the solid wood of the tree while the bases 37 are in the bark. Prongs 35 extend upwardly from plate 25 and the plate permits a firm grip without excessive penetration while also causing the plate to fall away from a tree as the tree falls.

Preferably the first elongated pressure member 26 includes the jack cylinder 29 and an extension 38 coaxial therewith and fixed thereto as by bolts 39. Extension 38 and member 27 are of solid, rigid material such as metal while cylinder 29 is of hollow rigid metal. The flat anchor plate 24 is immovably fixed to the lower terminal end 41 of extension 38 as by welding and is angularly related thereto in order to overlie the ground flatwise. Plate 24 is provided with a plurality of spaced spaded prongs 42, identical with each other and in parallelism with each other and with the members 26 and 27.

Preferably two lines 43 and 44 of spaced prongs 42 are provided and each prong 42 is of sufficient length to penetrate the ground relatively deeply such as three or four inches.

Because of the parallelism of prongs 35 and 42 with the main body of the jack, they tend to pull out of both ground and tree as the tree falls with the jack falling harmlessly to the ground. The plates 24 and 25, on the other hand, prevent the prongs fom penetrating too deeply under the weight of a tree gradually tilting toward the jack during the cutting at cut 21.

I claim:

1. A tree felling jack comprising a flat anchor plate adapted to overlie the ground and having a plurality of spaced ground penetrating spades of identical length angularly depending in parallelism therefrom; a curved anchor plate adapted to overlie a tree trunk and having a plurality of spaced tree penetrating prongs of identical length angularly projecting in parallelism therefrom; a first elongated pressure member of rigid material immovably fixed to said flat anchor plate and extending angularly upwardly therefrom; a second elongated pressure member of rigid material immovably fixed to said curved anchor plate and extending angularly downwardly therefrom in axial alignment with said first member and hydraulic jack mechanism having a cylinder coaxial with, and interposed between, said members for slideably applying thrust longitudinally of said pressure members, said spades, prongs, jack cylinder and pressure members all being in parallelism for quick release of said jack upon felling of a tree in a direction away therefrom.

2. A combination as specified in claim 1 wherein the spades and prongs of said anchor plates are each disposed in two spaced parallel lines, and said prongs each are cylindrical at the base thereof but sharply pointed at the terminal end thereof for easy withdrawal from the trunk of a tree.

3. A combination as specified in claim 1 wherein said hydraulic jack mechanism includes remote control means for creating pressure in said cylinder; said first elongated pressure member includes the cylinder thereof and said second elongated pressure member comprises the piston thereof.

4. A tree felling jack comprising hydraulic jack mechanism having a cylinder and an elongated piston; a curved vertically disposed, anchor plate adapted to overlie the bark of a tree intermediate of the height of said tree, said plate being angularly fixed to the terminal end of said piston and having a plurality of spaced tree penetrating prongs in parallelism with said piston, a rigid, coaxial extension immovably fixed to said cylinder and a flat, horizontally-disposed, anchor plate adapted to overlie the ground, said flat plate being angularly fixed to the terminal end of said extension and having a plurality of spaced ground penetrating spades in parallelism with said extension and cylinder, said plates limiting penetration of said prongs and spades upon the tilting of said tree toward said jack and said parallelism permitting ready release of said jack upon the tilting of said tree away from said jack.

References Cited in the file of this patent

UNITED STATES PATENTS

| 339,276 | Dodge | Apr. 6, 1886 |
| 634,905 | McCauley | Oct. 17, 1899 |
| 1,410,380 | Daniels | Mar. 21, 1922 |
| 1,482,846 | Harrah | Feb. 5, 1924 |
| 2,583,945 | Jacobs | Jan. 29, 1952 |
| 2,757,903 | Bill | Aug. 7, 1956 |